United States Patent Office 3,718,690
Patented Feb. 27, 1973

3,718,690
FORMATION OF NAPHTHALENE-2,6-DICARBOXYLIC ACID
Ronald D. Bushick, Glen Mills, Pa., and Oscar L. Norman, Wilmington, Del. (both % Sun Oil Company, P.O. Box 426, Marcus Hook, Pa. 19061), and Harry J. Spinelli, 14 New Almond St., Vineland, N.J. 08360
No Drawing. Filed Dec. 30, 1971, Ser. No. 214,467
Int. Cl. C07c 63/38
U.S. Cl. 260—515 P                                   4 Claims

ABSTRACT OF THE DISCLOSURE

A method of preparing pure naphthalene-2,6-dicarboxylic acid in high selectivity by reacting sodium-2-naphthoate with carbon monoxide, sodium carbonate and sodium formate at a temperature in the range of about 275 to 450° C. and in a carbon monoxide atmosphere at a gauge pressure of about 300 to 700 p.s.i.

BACKGROUND OF THE INVENTION

(1) Field of the invention

This invention relates to a novel process for the preparation of naphthalene-2,6-dicarboxylic acid in high selectivity.

(2) Description of the prior art

Naphthalene dicarboxylic acid in which the carboxyl groups are located at the 2,6-positions is a highly desirable article of commerce, particularly in that it can be used for making polyester resins which have outstandingly good properties for fiber application. This dicarboxylic acid can be obtained by liquid phase oxidation of 2,6-dimethylnaphthalene in several ways. One known procedure involves the use of molecular oxygen (e.g., air) at temperatures in the range of 100–250° C. while utilizing a catalyst system comprising a heavy metal oxidation catalyst and bromine or a bromine compound. This type of oxidation process has been described in Saffer et al. U.S. Pat. No. 2,833,816. By way of example, 2,6-dimethylnaphthalene can be converted to the corresponding diacid by contacting an acetic acid solution of the dimethylnaphthalene containing a cobalt acetate-ammonium bromide co-catalyst with molecular oxygen at a temperature in the range of 110–135° C.

A particularly suitable procedure for converting 2,6-dimethylnaphthalene to the corresponding naphthalene-2,6-dicarboxylic acid involves the use of nitrogen dioxide ($NO_2$) in combination with selenium. The procedure involves dissolving the 2,6-dimethylnaphthalene in an inert solvent such as trichlorobenzene, adding a small amount of selenium to the mixture and contacting the mixture in liquid phase with gaseous $NO_2$ at a temperature about 140° C., preferably in the range of 180–230° C. This procedure is capable of producing the 2,6-diacid in a yield generally in excess of 80% of the theoretical.

For commercial practice a difficulty in producing naphthalene-2,6-dicarboxylic acid by the foregoing oxidation routes lie in finding a suitable source of the 2,6-dimethylnaphthalene isomer. This compound occurs in coal tar and cracked petroleum fractions of appropriate boiling range but only in low proportion, since it is associated with the various other dimethylnaphthalene isomers, monocyclic aromatics and non-aromatic hydrocarbons. A concentrate of the dimethylnaphthalene isomers can be obtained by solvent extraction of the fraction with an aromatic-selective solvent such as furfural or by azeotropic distillation with diethylene glycol, but the 2,6-isomer is still only a minor constituent of the concentrate. Furthermore, the separation by extraction and fractional crystallization adds greatly to processing costs.

Mixed dimethylnaphthalenes obtained from cracked petroleum fractions or coal tar can be distilled in the same manner as mentioned above for the 2,6-isomer to yield an impure mixture of the corresponding dicarboxylic acid isomers in which the 2,6-diacid is present typically in a concentration of only about 10%. A suitable means of increasing the yield of the 2,6-diacid is highly desirable.

It is also known that the dipotassium, dirubidium or dicesium salt of a pure naphthalene dicarboxylic acid in which the carboxyl groups occur other than at the 2,6-positions can be converted to the 2,6-dicarboxylate by the so-called Henkel reaction. The procedure involves heating the naphthalene dicarboxylic to a temperature in the range of 350–530° C., in contact with a catalyst which is salt or oxide of cadmium, zinc or mercury and in a carbon dioxide atmosphere at a gauge pressure of 50–1500 p.s.i.g. This causes a shift in position of the carboxylate groups to the 2,6-positions. The rearrangement will occur regardless of whether the two carboxylate groups in the starting material are located on the same ring or on different rings of the naphthalene nucleus. The disalts of alkali metals other than potassium, rubidium and cesium do not appear to be capable of giving satisfactory yields of the 2,6-dicarboxylate by this procedure.

However, if the naphthalene dicarboxylic acid contains impurities like products of incomplete oxidation, i.e. aldehydes, alkyl containing compounds obtained by liquid phase partial oxidation of mixed dimethylnaphthalenes by procedures such as discussed above, the Henkel reaction of the dipotassium, dirubidium or dicesium salts thereof will not proceed in the manner desired. Little, if any, of the 2,6-product will be produced from the other isomers.

In a commercial operation purifying the naphthalene dicarboxylic acid and resorting to one or more operational steps to recover and reuse the expensive catalysts employed in the above processes adds considerably to the cost of operation.

As a result there has been a need for a process to produce high purity naphthalene-2,6-dicarboxylic acid with a minimal production of the less desirable isomers and which does not require the use of expensive catalysts with the attendant costly catalyst recovery operations.

SUMMARY OF THE INVENTION

We have found a simple and economical process for producing in high selectivity and high purity naphthalene-2,6-dicarboxylic acid by the reaction of sodium-2-naphthoate with sodium carbonate, sodium bicarbonate and sodium formate and carbon monoxide at a partial pressure of about 300 to 700 p.s.i. at a temperature in the range of about 275 to 375° C. The use of a catalyst is not necessary in this reaction. Since sodium salts are considerably less expensive than potassium, rubidium or cesium, the discovery of this invention substantially reduces the production costs of naphthalene-2,6-dicarboxylic acid.

DESCRIPTION OF THE PREFERRED EMBODIMENT

In carrying out the process of this invention sodium formate, sodium naphthoate, sodium carbonate, and sodium bicarbonate are introduced into an autoclave. It is preferable in commercial operations to use either a rotary autoclave or an autoclave with a stirring device. Generally equal molar proportions of reactants are employed. However, it is preferable if a slight excess of sodium bicarbonate is used. Thus the weight ratio of sodium bicarbonate may vary from about 1:1 to 5:1, but preferably from 1:1 to 3:1. Into this reaction mixture carbon monoxide is charged until a gauge pressure of 300 to 700 p.s.i. and preferably 400 is reached. The autoclave is then heated slowly to reach reaction temperature which may range from about 275 to 450° C. but preferably from about 275 to 375° C. The carboxylation reaction yields, disodium-naphthalene-2,6-dicarboxylate. Pure naphthalene-2,6-dicarboxylic acid is obtained by acidifying the disodium salt with a mineral acid such as sulfuric acid or hydrochloric acid.

The following examples are specific illustrations of the invention:

EXAMPLE I

Salt preparation

The sodium-2-naphthoate was prepared by adding an equal molar quantity of 2-naphthoic acid to an aqueous solution of sodium hydroxide with stirring. The base concentration was equivalent to the added acid. After filtration, the salt solution was stripped on a steam bath in a Rinco evaporator at water pump pressure. The salt was washed with ether and dried for at least 24 hours at 100° C. (0.1 mm.). After drying the free-flowing salt was checked for residual acid and water by means of an infrared spectrum.

EXAMPLE II

Direct carboxylation

A mixture of 19.4 grams sodium-2-naphthoate obtained in Example I, 10.6 grams sodium carbonate, 6.8 grams sodium formate and 48.5 grams sodium bicarbonate was added to an autoclave equipped with a thermocouple and mixed and heated overnight to 110° C. After cooling and taking precautions to exclude moisture, the vessel was purged three times with nitrogen and twice with carbon monoxide. The carbon monoxide was introduced until the internal pressure reached 400 p.s.i. gauge, the reaction mixture was heated to 300° C. and maintained at this temperature for 15 hours. After cooling, the raw carboxylation product formed thereby was dissolved in 300 ml. hot water and filtered to remove any insoluble material. The naphthalene-2,6-dicarboxylic acid was precipitated from the aqueous solution with concentrated sulfuric acid. The solid organic acid precipitate was separated by vacuum filtration after the solution had been allowed to cool. The precipitate was treated by repeated extraction with hot water and washing with methanol. The selectivity of pure naphthalene-2,6-dicarboxylic acid was 100%.

Analysis of the product was done by infrared spectra and melting point. The method of this invention provides naphthalene-2,6-dicarboxylic acid exclusively in 100% selectivity.

Although the invention has been described in considerable detail with reference to certain preferred embodiments thereof, variations and modifications can be effected within the spirit and scope of the invention as described hereinbefore, and as defined in the appended claims.

We claim:

1. Method of preparing naphthalene-2,6-dicarboxylic acid which comprises reacting sodium-2-naphthoate, sodium carbonate, sodium bicarbonate, sodium formate and carbon monoxide at a partial pressure of 300 to 700 p.s.i. and at a temperature in the range of about 275 to 450° C., whereby disodium naphthalene-2,6-dicarboxylate is formed and converting said dicarboxylate to naphthalene-2,6-dicarboxylic acid by acidification.

2. Method according to claim 1 wherein the temperature is in the range of 275 to 375° C.

3. Method according to claim 1 wherein the partial pressure is in the range of 400 to 500 p.s.i.

4. Method according to claim 1 wherein the mineral acid is sulfuric acid.

References Cited

UNITED STATES PATENTS 3,043,846   7/1962   Blaser et al. _____ 260—515

OTHER REFERENCES

McNelis, J. Org. Chem., vol. 30 (1965), pp. 1209–13.

JAMES A. PATTEN, Primary Examiner